United States Patent
Udriste et al.

(10) Patent No.: US 9,944,396 B2
(45) Date of Patent: Apr. 17, 2018

(54) AIRCRAFT SEAT WITH SEGMENTED SEATBACK FOR ACHIEVING IN-BED LOUNGE SITTING POSITION

(71) Applicant: B/E Aerospace, Inc., Wellington, FL (US)

(72) Inventors: Daniel Udriste, Coral Springs, FL (US); Javier Valdes De La Garza, Miami, FL (US)

(73) Assignee: B/E AEROSPACE, INC., Wellington, FL (US)

( * ) Notice: Subject to any disclaimer, the term of this patent is extended or adjusted under 35 U.S.C. 154(b) by 309 days.

(21) Appl. No.: 14/672,914

(22) Filed: Mar. 30, 2015

(65) Prior Publication Data

US 2015/0274301 A1 Oct. 1, 2015

Related U.S. Application Data

(60) Provisional application No. 61/971,828, filed on Mar. 28, 2014.

(51) Int. Cl.
*B64D 11/06* (2006.01)

(52) U.S. Cl.
CPC ...... *B64D 11/0641* (2014.12); *B64D 11/0602* (2014.12); *B64D 11/0642* (2014.12); *B64D 11/0643* (2014.12); *B64D 11/0646* (2014.12)

(58) Field of Classification Search
CPC ............ B64D 11/0641; B64D 11/0642; B64D 11/0643; B64D 11/0646; B64D 11/0602
USPC ........................................ 297/284.3, 354.13
See application file for complete search history.

(56) References Cited

U.S. PATENT DOCUMENTS

| 5,098,158 | A | 3/1992 | Palarski | |
|---|---|---|---|---|
| 6,059,364 | A * | 5/2000 | Dryburgh | A47C 1/0352 297/354.13 X |
| 6,929,320 | B2 * | 8/2005 | Laurent | B60N 2/22 297/354.13 |
| 7,802,846 | B2 * | 9/2010 | Bellefleur | A47C 1/0244 297/284.3 X |
| 2004/0036336 | A1 * | 2/2004 | Veneruso | B60N 2/0232 297/354.13 X |
| 2004/0256894 | A1 | 12/2004 | McManus et al. | |

(Continued)

FOREIGN PATENT DOCUMENTS

| FR | 2 859 175 | A1 | 3/2005 |
|---|---|---|---|
| FR | 2859175 | A1 | 3/2005 |

OTHER PUBLICATIONS

International Search Report issued by the European Patent Office dated May 28, 2015 for PCT/US2015/023319.

(Continued)

*Primary Examiner* — Anthony D Barfield
(74) *Attorney, Agent, or Firm* — Shumaker, Loop & Kendrick, LLP

(57) ABSTRACT

An adjustable aircraft passenger seat including a seat bottom, a legrest adjustable in angle relative to the seat bottom, a seatback adjustable in angle relative to the seat bottom, the seatback segmented into a lower seatback and an upper seatback, the lower seatback adjustable in angle relative to the seat bottom and the upper seatback adjustable in angle relative to the lower seatback, and a headrest adjustable in height relative to the upper seatback.

16 Claims, 15 Drawing Sheets

(56) References Cited

U.S. PATENT DOCUMENTS

2005/0151404 A1* 7/2005 Dowty .................... B60N 2/62
 297/284.3 X
2007/0262625 A1 11/2007 Dryburgh et al.
2015/0008708 A1* 1/2015 Erhel ................ B64D 11/0646
 297/354.13 X

OTHER PUBLICATIONS

International Search Report PCT/US2015/023319 dated May 28, 2015.

* cited by examiner

AIRCRAFT SEAT WITH SEGMENTED SEATBACK FOR ACHIEVING IN-BED LOUNGE SITTING POSITION

CROSS-REFERENCE TO RELATED APPLICATION

This application claims priority from U.S. Application No. 61/971,828 filed Mar. 28, 2014, the entirety of which is incorporated by reference herein.

TECHNICAL FIELD AND BACKGROUND OF THE INVENTION

The present invention relates generally to the field of aircraft seat design, and more particularly, to an aircraft seat having a segmented seatback divided into a lower seatback, an upper seatback, and a headrest that move independently as the seat reclines to achieve an in-bed lounge sitting position, among other sitting positions.

Aircraft seat manufacturers are continuously looking to improve seat comfort and adjustability to enhance the flying experience, particularly in premium seating classes. The most luxurious types of seating classes include individual passenger suites, commonly referred to as "mini-suites," which typically include lie-flat capable seats, premium media equipment and electronics, enhanced lighting, desks and other amenities.

Conventional lie-flat capable seats are configured to selectively adjust between an upright sitting position required for taxi, takeoff and landing ("TTOL"), and a sleeping position in which the seatback, seat bottom and legrest together form a flat, horizontal bed. In intermediate sitting positions, while the angle of the seatback and the legrest may be independently adjustable relative to the seat bottom, there is no adjustability in the contour or curvature of the seatback itself. Therefore, certain sitting positions cannot be achieved, for example, a hybrid bed/lounge sitting position in which the legrest and seat bottom are horizontal and the seatback curved upward to provide a comfortable lounge position for reading or watching television.

BRIEF SUMMARY OF THE INVENTION

It is therefore an object of the invention to provide a passenger seat having a seatback segmented into separate sections configured to adjust independent of one another to provide curvature to the seatback to achieve additional sitting positions.

It is another object of the invention to provide an aircraft passenger seat in which the seatback is segmented into an independently adjustable lower seatback, upper seatback, and headrest.

It is another object of the invention to provide an aircraft passenger seat including a segmented seatback in which the lower seatback is adjustable in angle relative to the seat bottom, and the upper seatback is adjustable in angle relative to the lower seatback.

It is another object of the invention to provide an aircraft passenger seat including a headrest adjustable in height and/or angle relative to an adjacent seatback portion.

It is another object of the invention to provide an adjustable headrest including a center portion positioned between a pair of adjustable side portions, the center portion being adjustable in height and/or angle relative to an adjacent seatback portion and the side portions adjustable in angle relative to the center portion.

It is another object of the invention to provide an adjustable aircraft passenger seat employing multiple actuators, with one actuator dedicated for driving lower seatback movement, another actuator dedicated for driving upper seatback movement relative to the lower seatback, yet another actuator dedicated for driving headrest movement, and yet another actuator dedicated for driving legrest deployment when a legrest is present.

It is yet another object of the invention to provide an adjustable aircraft passenger seat capable of achieving an in-bed lounge sitting position in which the seat bottom and legrest are generally horizontal, and the seatback is curved to support the upper body and head of a seated passenger in a comfortable sitting-up position for reading and watching television.

To achieve the foregoing and other objects and advantages, the present invention provides an adjustable aircraft passenger seat including a seat bottom, a legrest adjustable in angle relative to the seat bottom, a seatback adjustable in angle relative to the seat bottom, the seatback segmented into a lower seatback and an upper seatback, the lower seatback adjustable in angle relative to the seat bottom and the upper seatback adjustable in angle relative to the lower seatback, and a headrest adjustable in height relative to the upper seatback.

In another aspect, the adjustable aircraft passenger seat is adjustable to achieve an upright sitting position for taxi, take-off and landing, and an in-bed lounge sitting position in which the legrest and seat bottom are coplanar, the lower seatback is at an angle to the seat bottom, and the upper seatback is at an angle to the lower seatback.

In another aspect, the seat may include a first actuator dedicated for lower seatback movement, a second actuator dedicated for upper seatback movement, a third actuator dedicated for headrest movement, and a fourth actuator dedicated for legrest movement.

In another aspect, the upper seatback may be pivotably attached at one end to the lower seatback, and the second actuator may be horizontally-oriented on a backside of the upper seatback to drive a rotating gear meshed with an arcuate toothed guide of the lower seatback to move the gear along a length of the arcuate toothed guide to adjust an angle of the upper seatback relative to the lower seatback.

In another aspect, the lower seatback may be pivotably attached at one end to the seat bottom, and the first actuator may be vertically-oriented on a backside of the lower seatback to drive pivoting movement of the lower seatback relative to the seat bottom.

In another aspect, the third actuator may be vertically-oriented on a backside of the upper seatback and connected to the headrest to drive the headrest toward and apart from the upper seatback.

In another aspect, the headrest may include a center portion and side portions adjustable relative to the center portion.

In another aspect, the headrest may be arranged to slide along vertically-oriented rails on a backside of the upper seatback to slide the headrest toward and apart from the upper seatback.

In another aspect, the seat may include left and right armrests positioned on opposite sides of the seat bottom.

According to another embodiment, the present invention provides an aircraft passenger suite including a plurality of privacy walls defining the bounds of the passenger suite, a passenger seat positioned within the passenger suite, and an ottoman positioned directly forward of the passenger seat, the seat including a seat bottom, a legrest adjustable in angle relative to the seat bottom, a seatback adjustable in angle relative to the seat bottom, the seatback segmented into a lower seatback and an upper seatback, the lower seatback adjustable in angle relative to the seat bottom and the upper seatback adjustable in angle relative to the lower seatback, and a headrest adjustable in height relative to the upper seatback.

In another aspect, the passenger seat is adjustable to achieve an upright sitting position for taxi, take-off and landing, and an in-bed lounge sitting position in which the legrest and seat bottom are coplanar, the lower seatback is at an angle to the seat bottom, and the upper seatback is at an angle to the lower seatback.

In another aspect, the ottoman may be spaced apart from the passenger seat such that a front of the ottoman aligns with an end of the legrest when deployed to extend seat length.

In another aspect, the passenger suite includes a video monitor positioned vertically above the ottoman and directly forward of the passenger seat.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
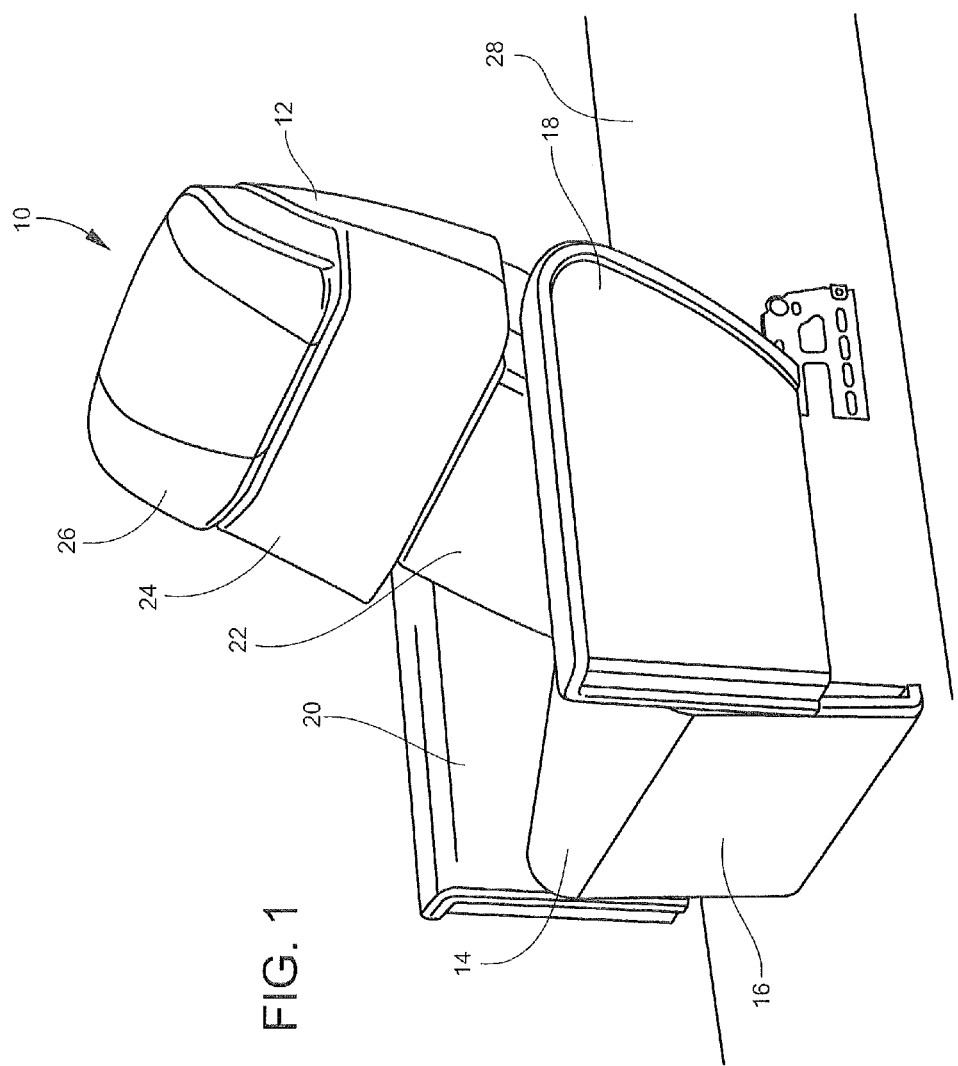
FIG. 1 is a front perspective view of an aircraft passenger seat according to an embodiment of the invention shown in an upright sitting position.
Figure 2:
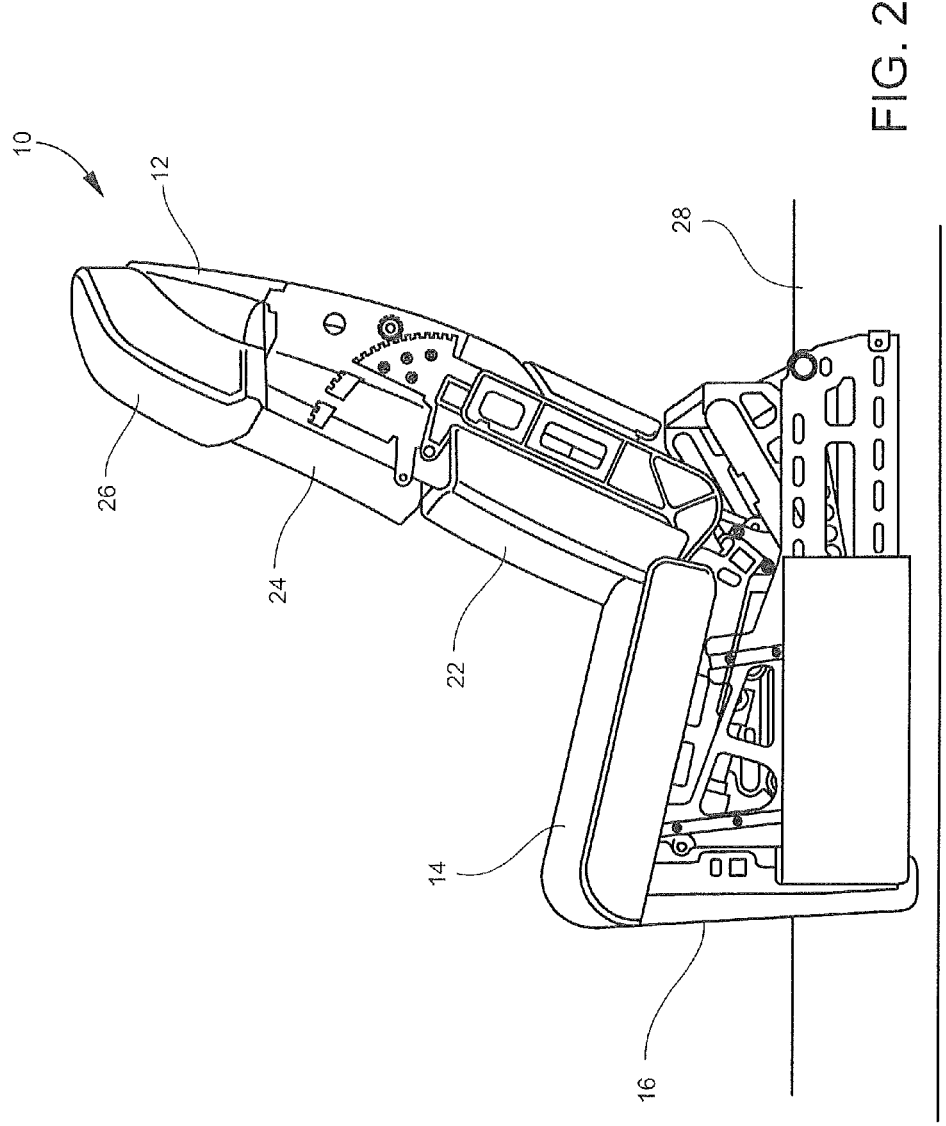
FIG. 2 is a side view of the seat of FIG. 1.
Figure 3:
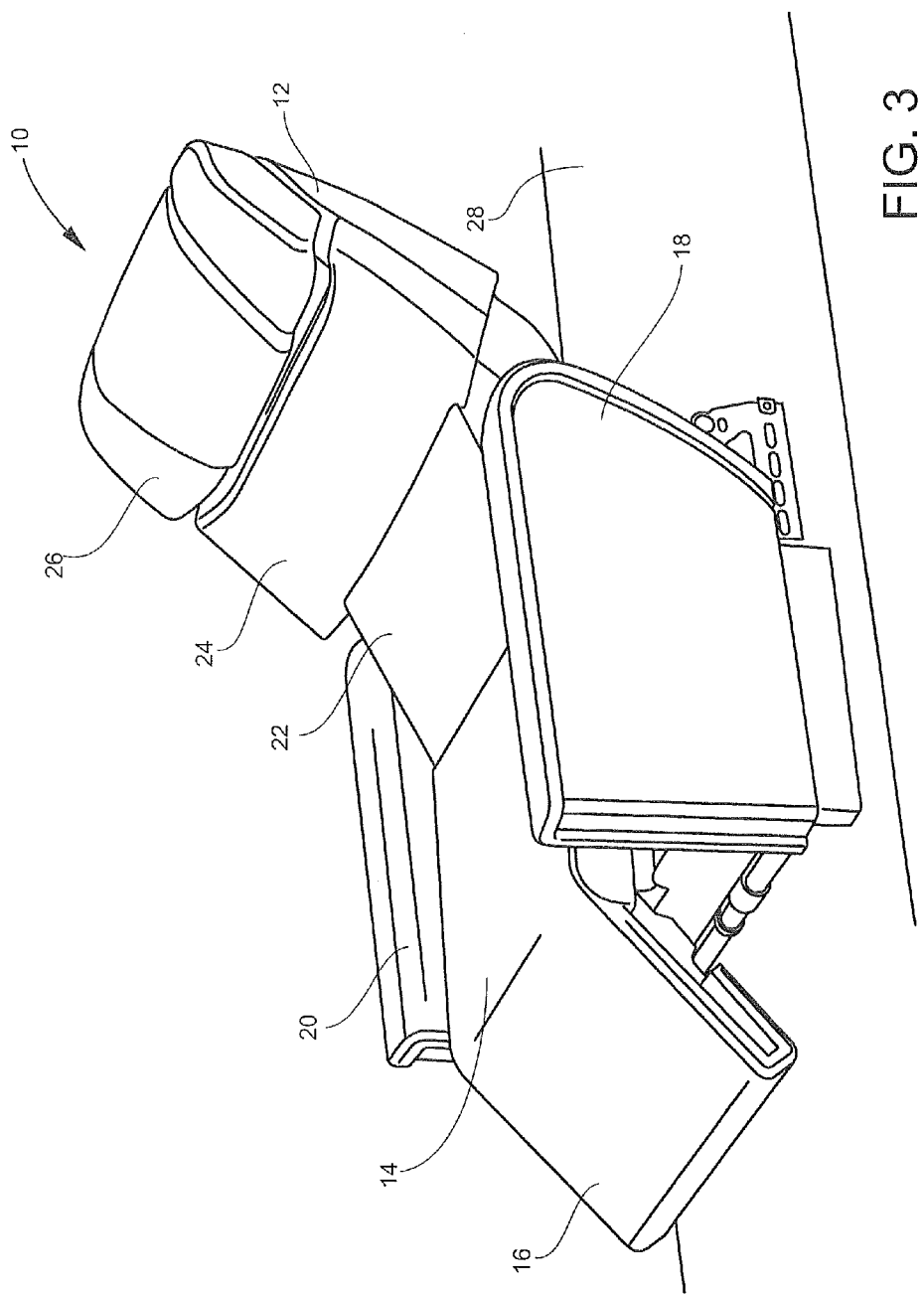
FIG. 3 is a front perspective view of the aircraft passenger seat of FIG. 1 shown in a reclined sitting position in which the legrest is partially deployed and the seatback curved.
Figure 4:
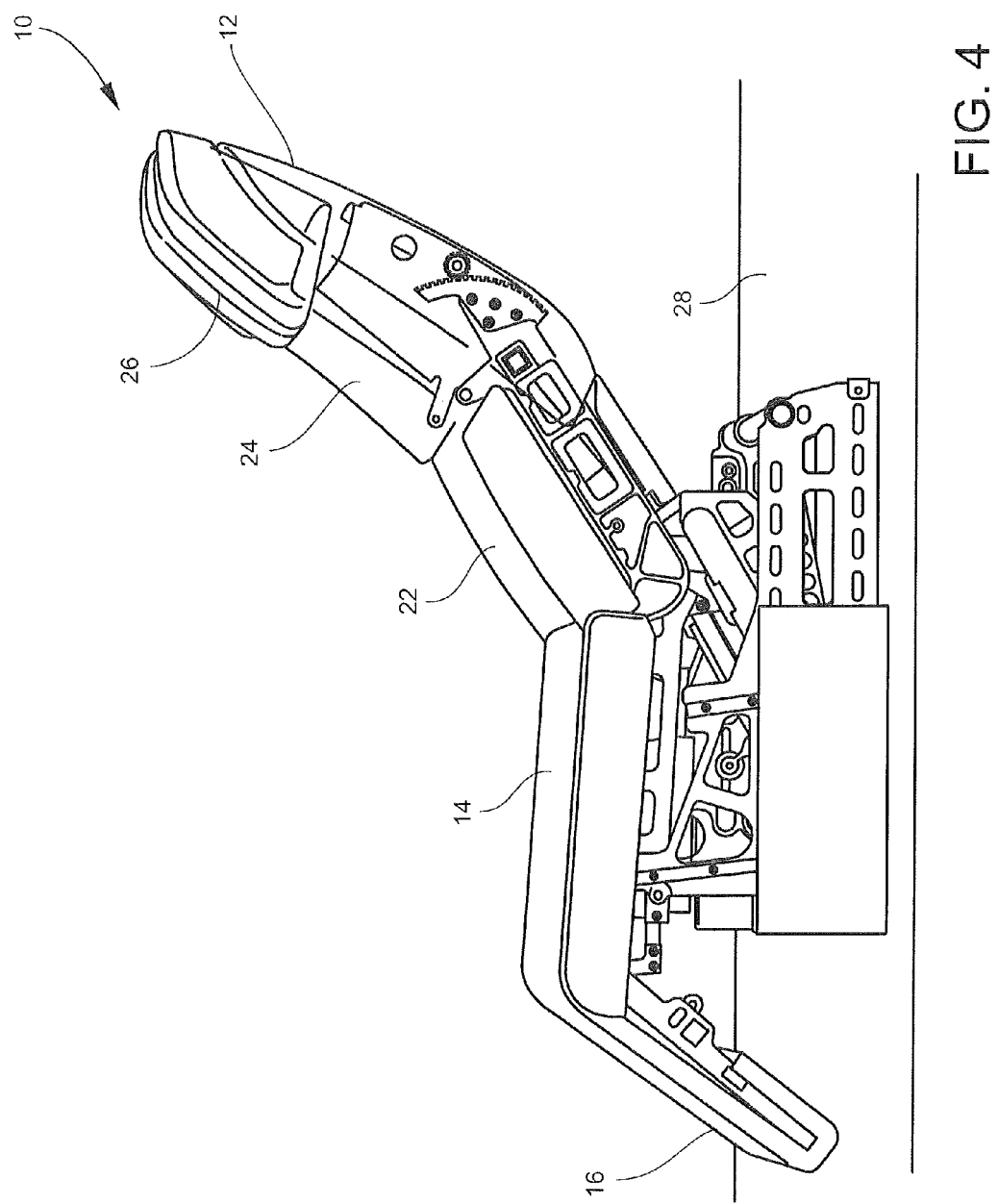
FIG. 4 is a side view of the seat of FIG. 3.
Figure 5:
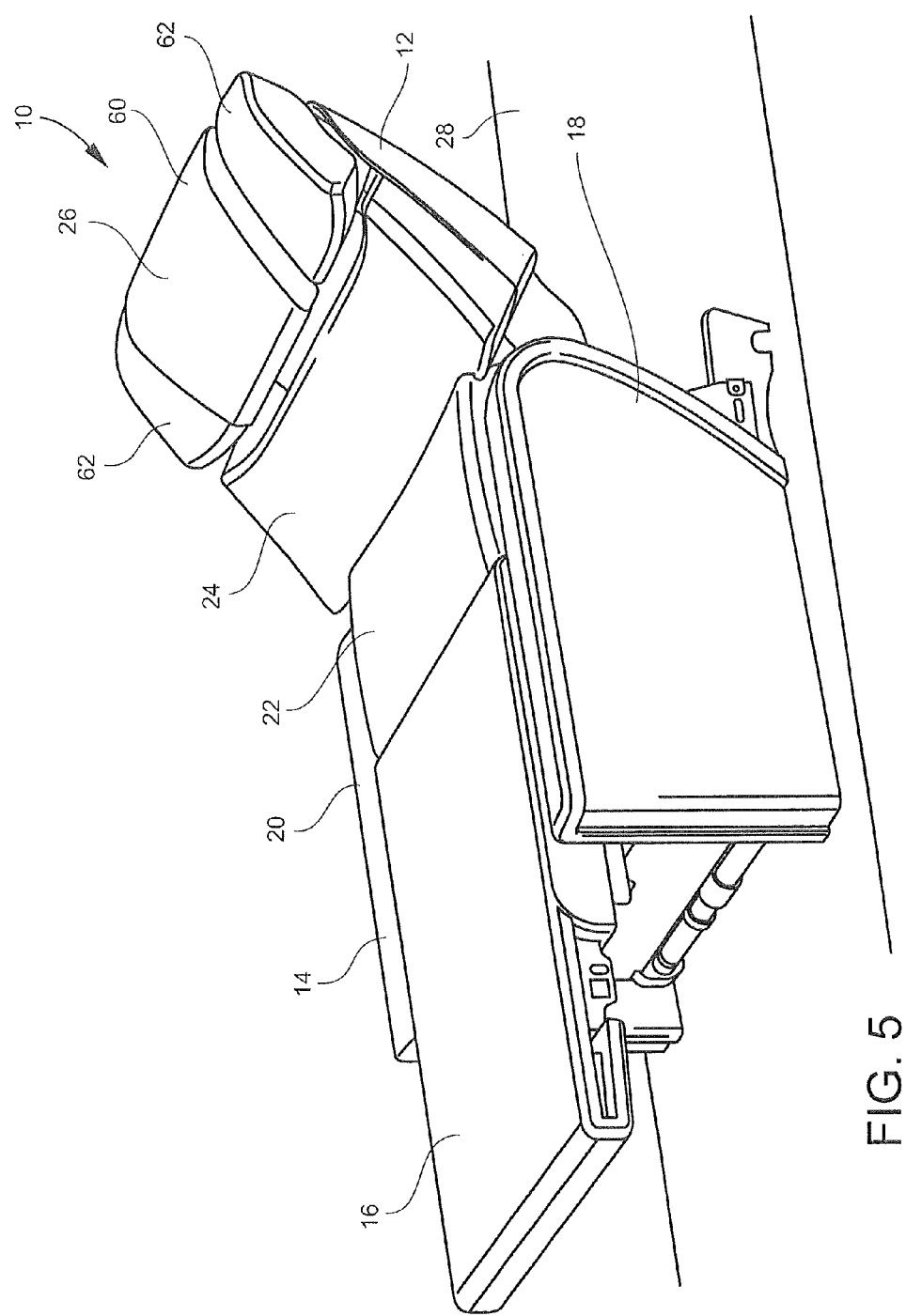
FIG. 5 is a front perspective view of the seat of FIG. 1 shown in an in-bed lounge sitting position.
Figure 6:
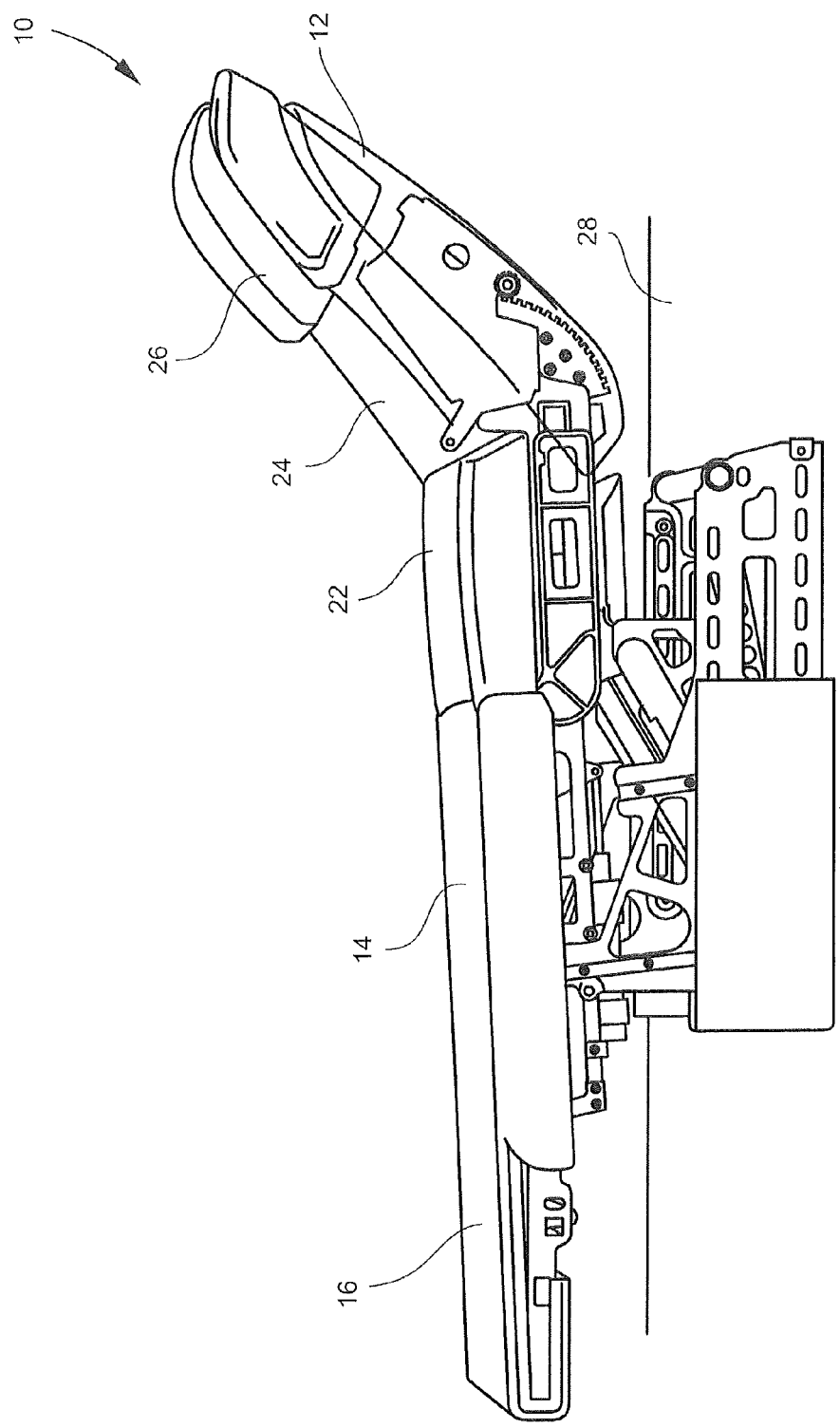
FIG. 6 is a side view of the seat of FIG. 5.
Figure 7:
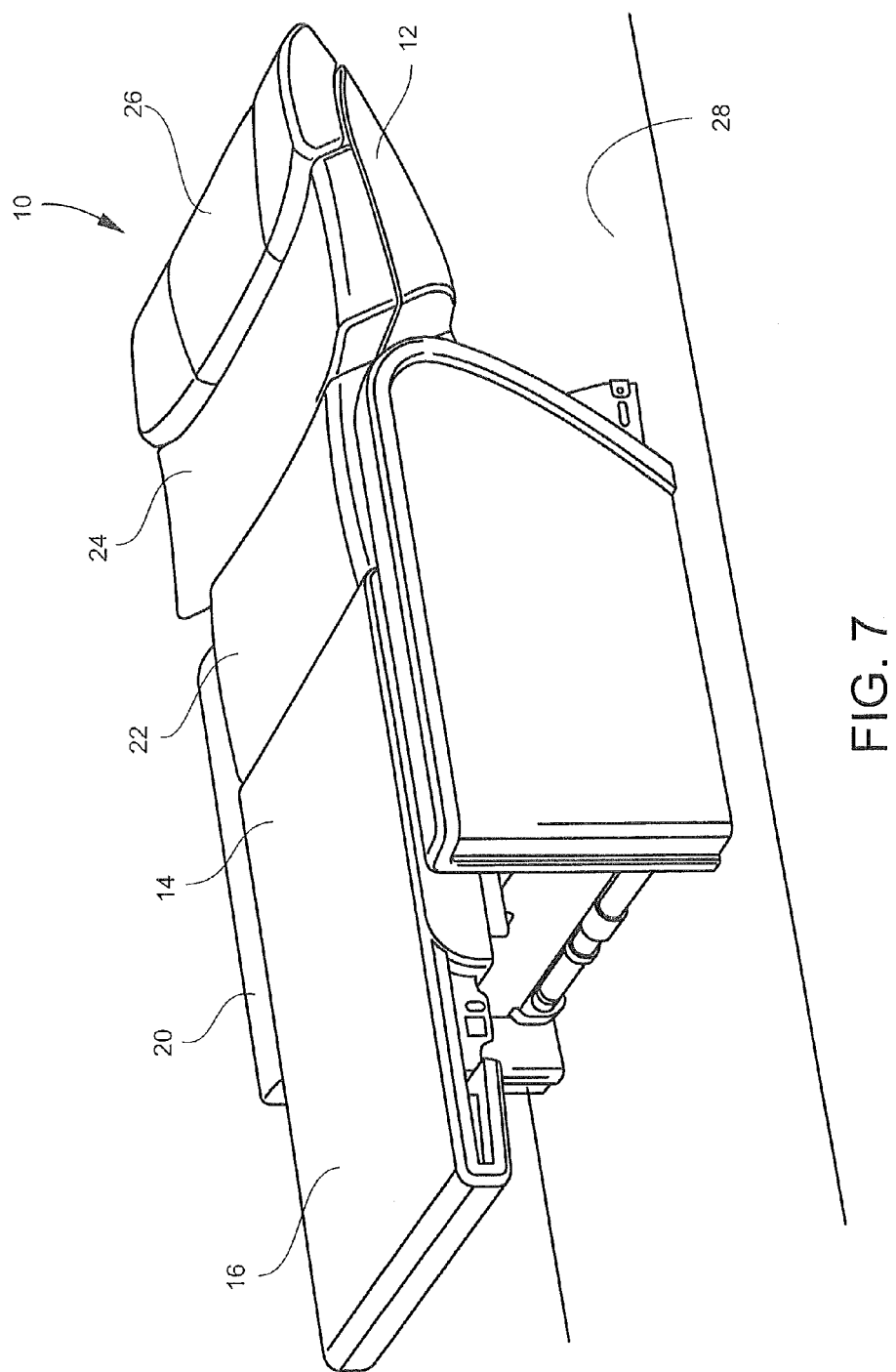
FIG. 7 is a front perspective view of the seat of FIG. 1 shown in a horizontal bed position.
Figure 8:
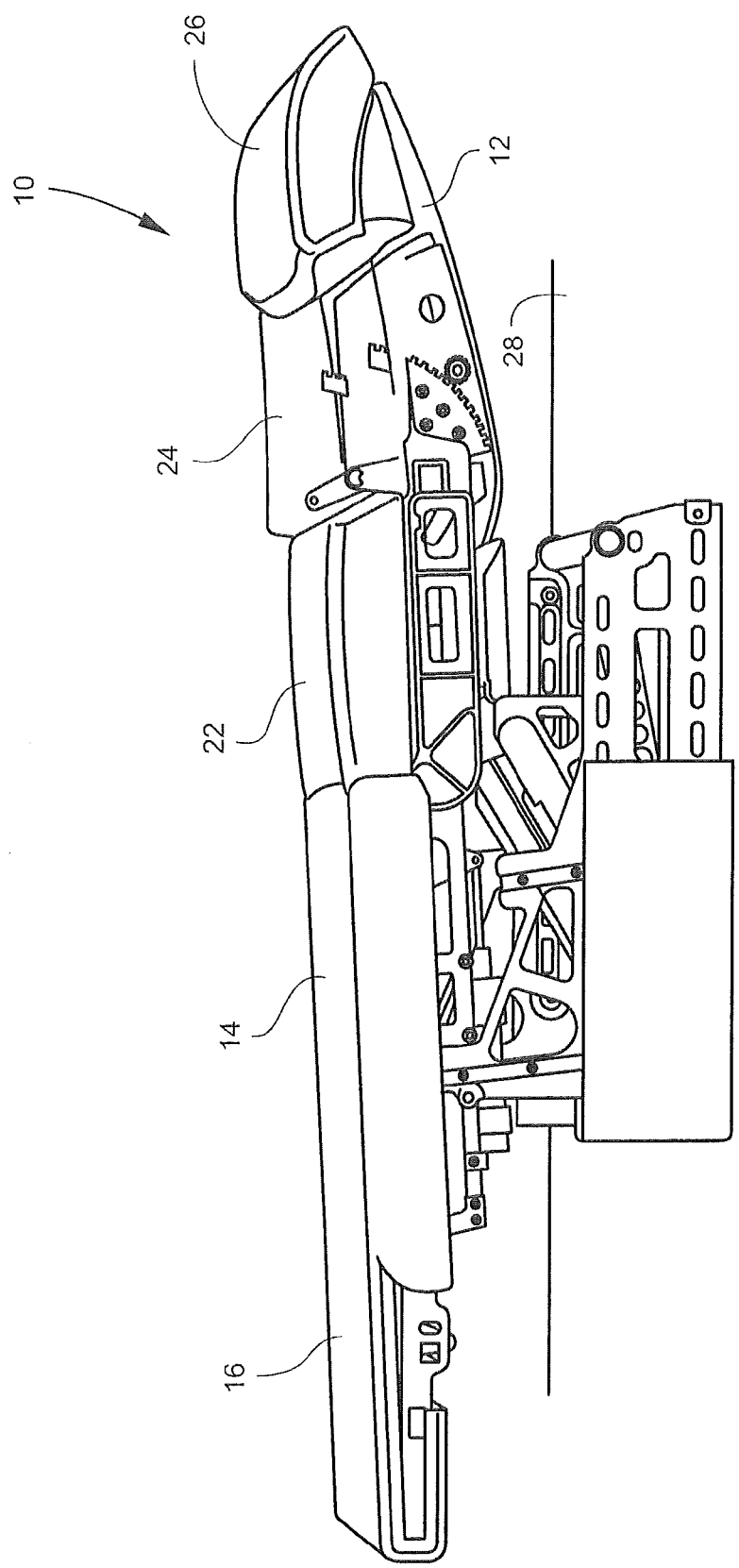
FIG. 8 is a side view of the seat of FIG. 7.
Figure 9:
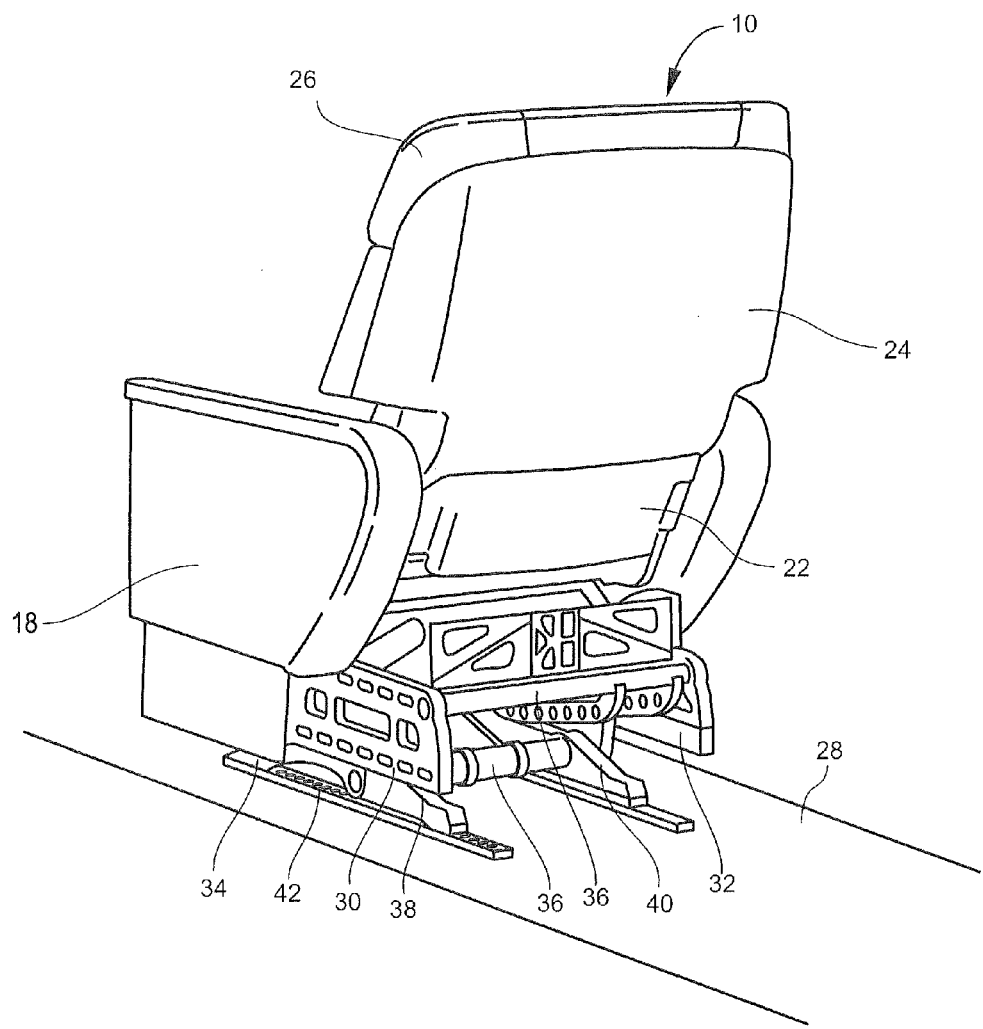
FIG. 9 is a rear perspective view of the seat of FIG. 1 showing the lower and upper seatbacks and the headrest.
Figure 10:
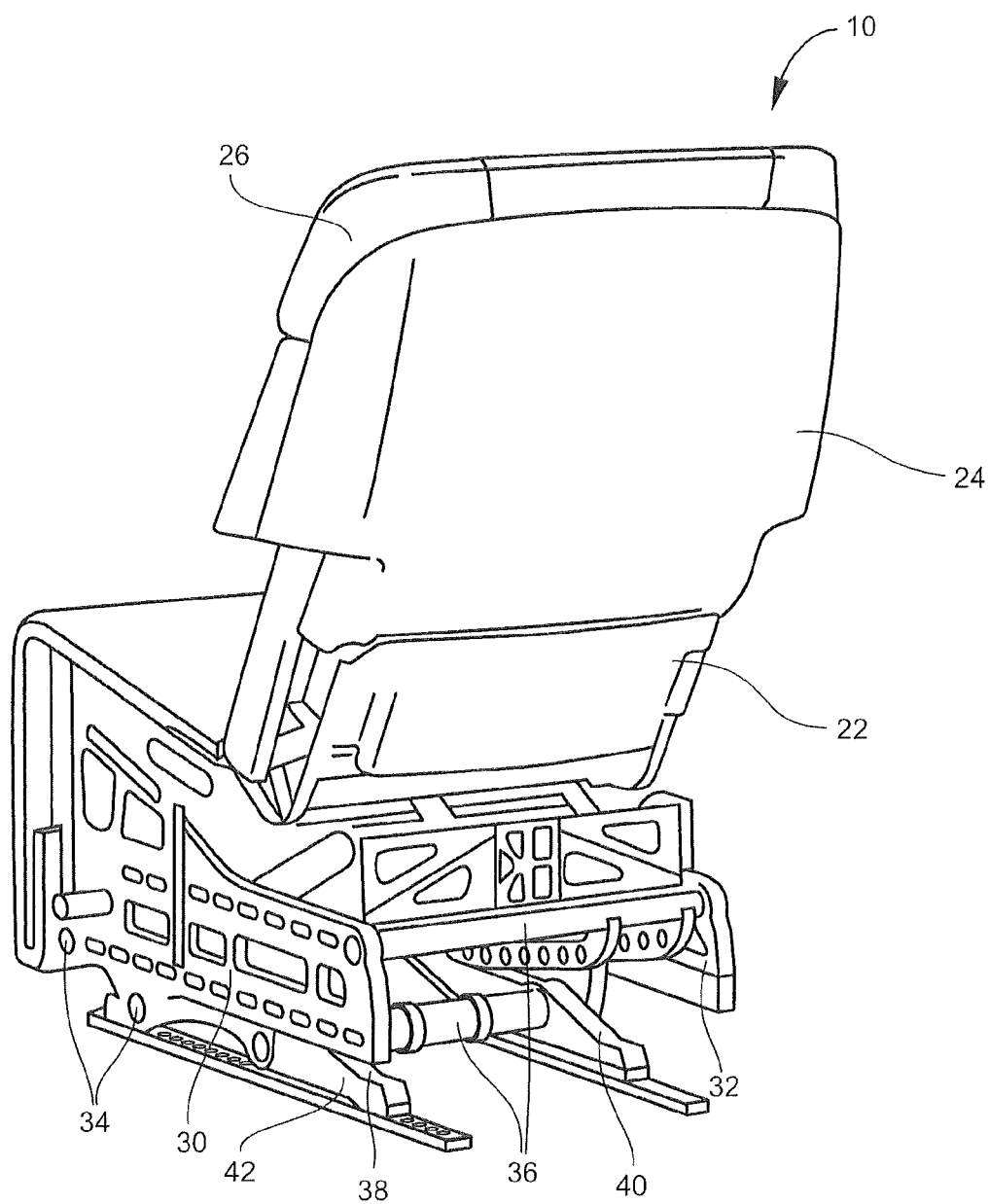
FIG. 10 is a rear perspective view of the seat of FIG. 9 shown with the armrests removed for clarity.
Figure 11:
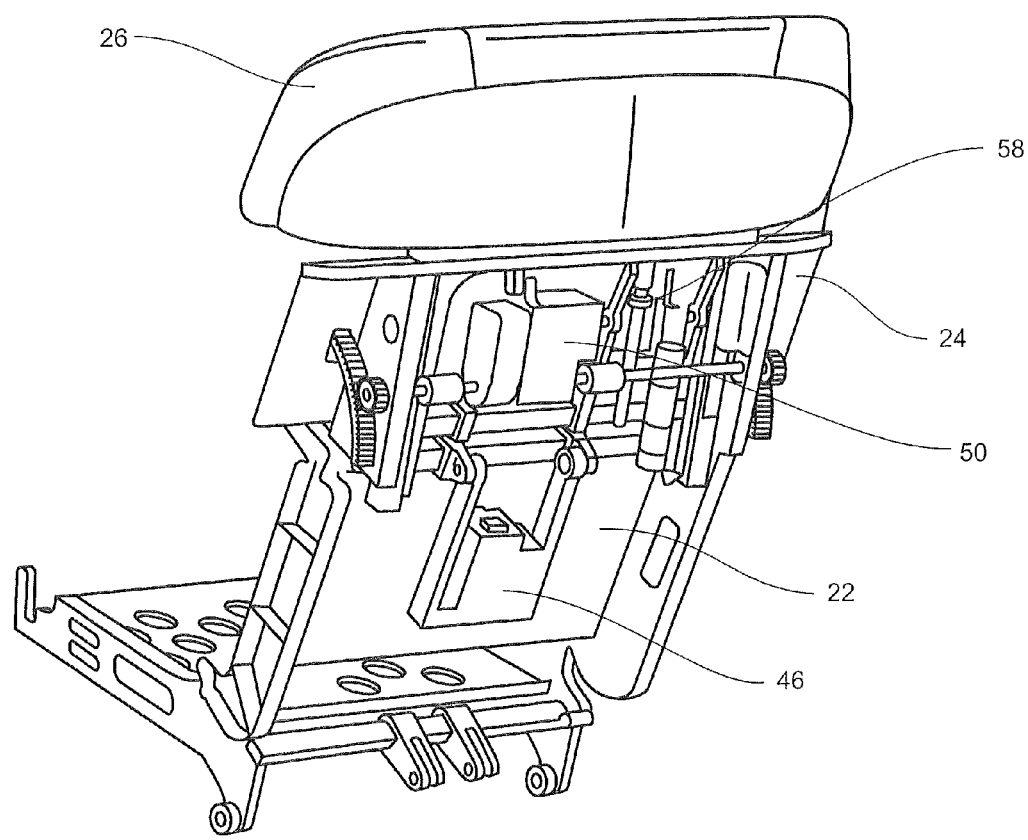
FIG. 11 is an isometric view of the seat pan, lower seatback, upper seatback and headrest portions of the seat of FIG. 1.
Figure 12:
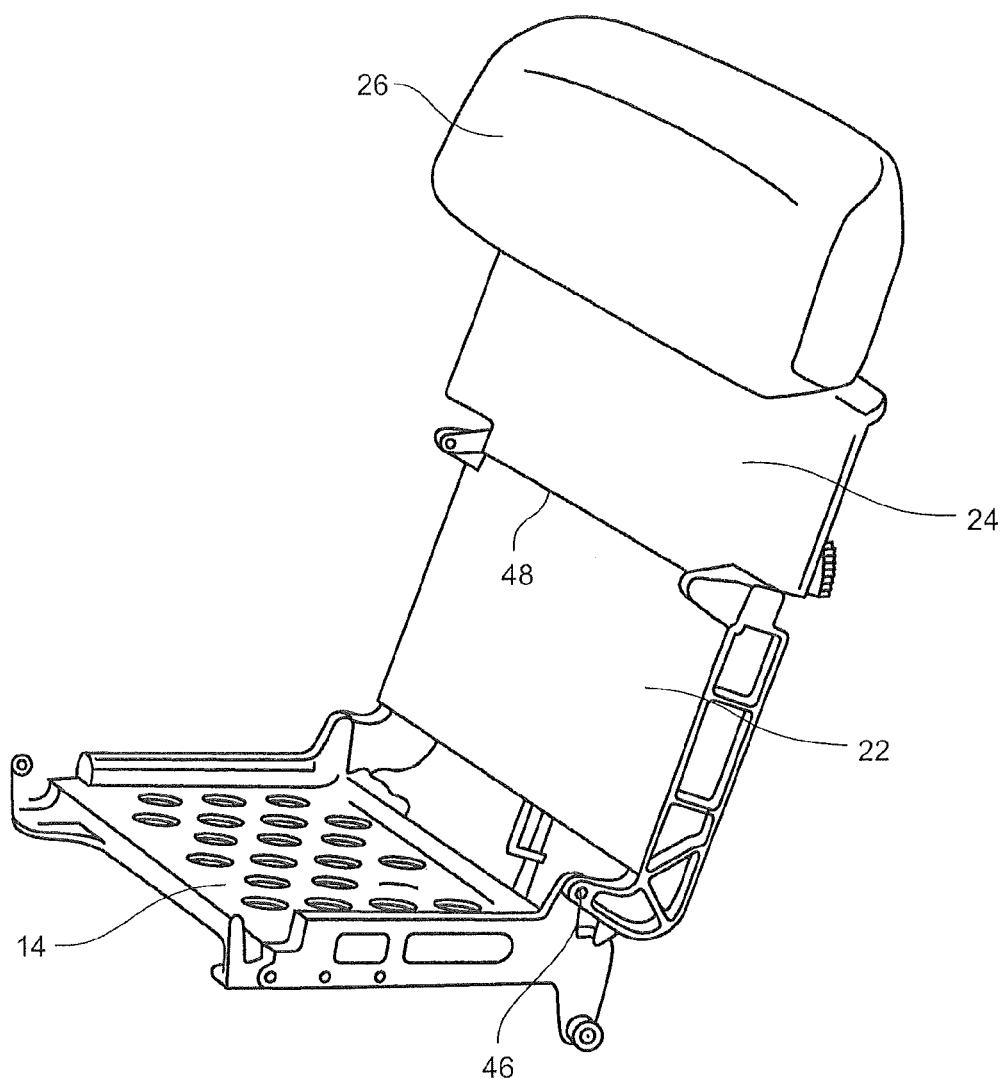
FIG. 12 is a front perspective view of the seat of FIG. 11.
Figure 13:
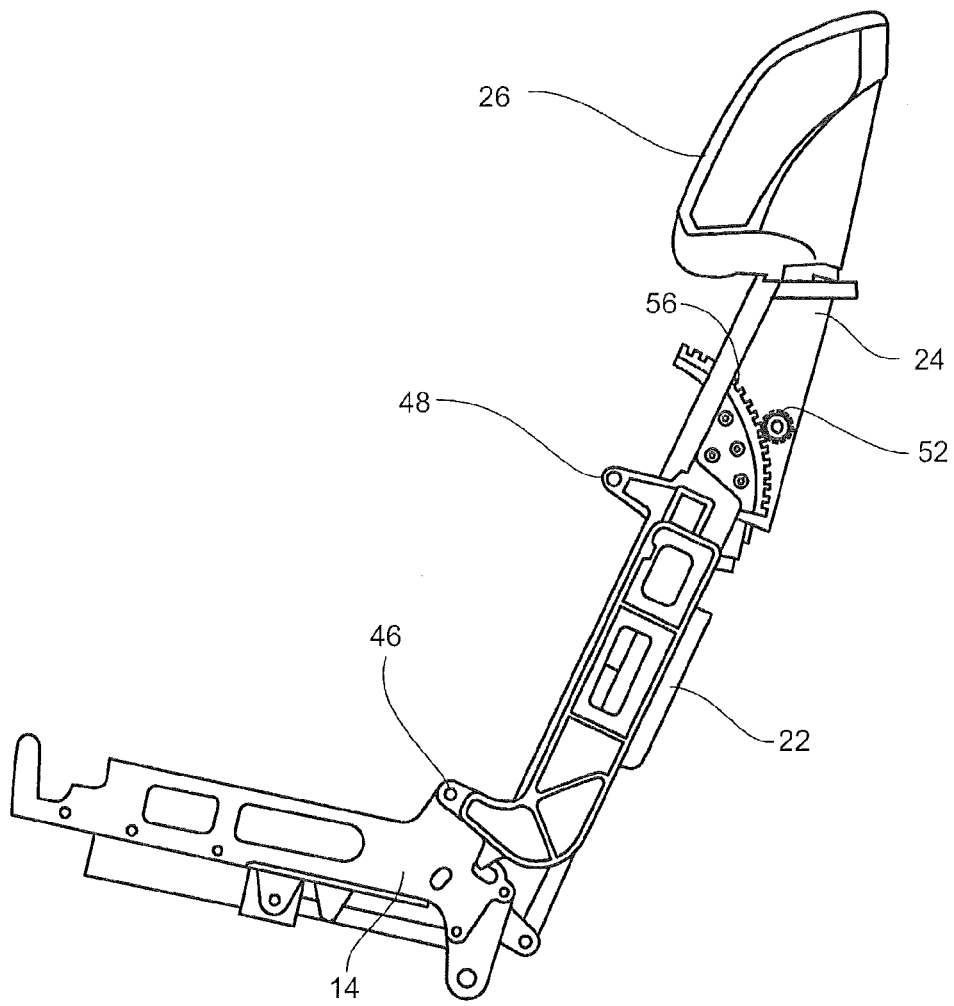
FIG. 13 side view of the seat of FIG. 11.
Figure 14:
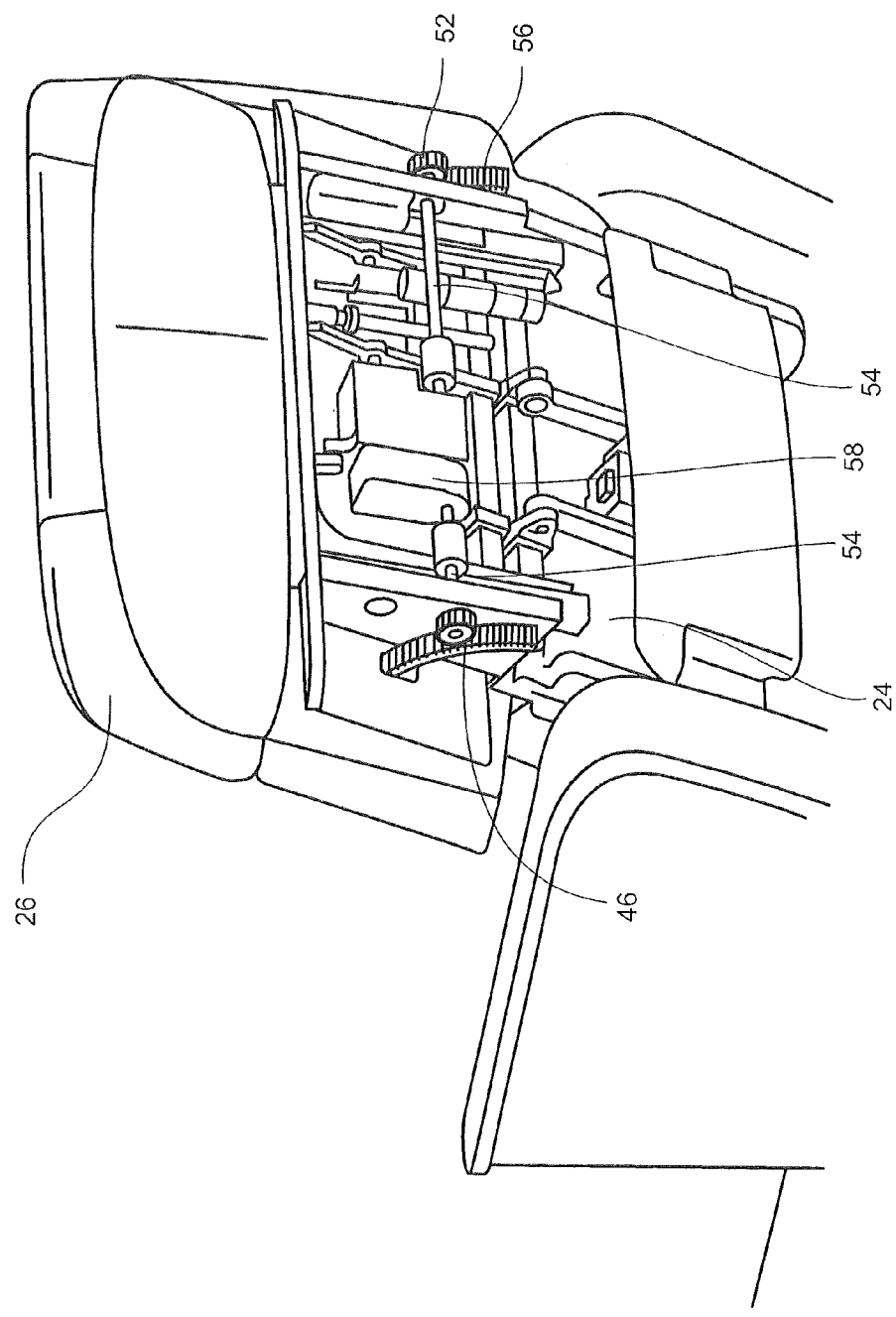
FIG. 14 is a detailed view of the interface of the upper seatback and headrest.

Referring to FIGS. 1-8, an aircraft seat according to a preferred embodiment of the invention is shown generally at reference numeral 10. The aircraft seat 10 is configured to selectively adjust between an upright sitting position (e.g., TTOL sitting position) as shown in FIGS. 1 and 2, and a horizontal sleeping position as shown in FIGS. 7 and 8, as well as a plurality of intermediate sitting and lounge positions as shown in FIGS. 3-6. FIGS. 3 and 4 in particular show the seat 10 in a reclined sitting position with the legrest partially deployed and the seatback reclined and curved to support the upper body and head in a comfortable upright sitting position. FIGS. 5 and 6 in particular show the seat 10 in an "in-bed lounge" sitting position with the legrest deployed to horizontal so as to be coplanar with the seat bottom, and the seatback reclined and curved to support the upper body and head in an upright sitting position comfortable for reading and watching television. The seat 10 is preferably steplessly adjustable between the various sitting, lounging and sleeping positions so as to be infinitely adjustable. As described below, the legrest and seatback are independently adjustable, as well as portions of the seatback and headrest.

The seat 10 generally includes a seatback 12, seat bottom 14, legrest 16, and left and right armrests 18, 20 positioned on opposite sides of the seat bottom. A single armrest may be shared between laterally adjacent seats, and one armrest may be provided along the wall in the case of a window seat. Seat surfaces that come into contact with the passenger are preferably cushioned and upholstered for comfort and durability. The back, bottom, sides and other out-of-contact surfaces may be shrouded for aesthetics and to conceal the underlying mechanicals. Shrouds may be constructed from plastics and other durable, lightweight materials.

Referring to FIGS. 1 and 2, respective perspective and side views show the seat 10 in an upright sitting position for TTOL. In the upright sitting position, the seatback 12 is at its steepest angle to the floor 28 (i.e., most vertical), the legrest 16 is stowed substantially vertically against the front of the seat, and the armrests 18, 20 are raised to their highest vertical position from the floor 28. The seatback 12 is segmented or "divided" into an independently adjustable lower seatback 22, upper seatback 24, and headrest 26, which together form the seatback. In the upright sitting position, the lower seatback 22, upper seatback 24, and headrest are aligned generally coplanar such that the seatback is substantially straight or has relatively little curvature.

Referring to FIGS. 3 and 4, respective perspective and side views show the seat 10 in a partially reclined sitting position in which the seatback 12 is at a shallow angle to the floor 28, the legrest 16 is partially raised, and the seat bottom 14 is translated forward and rotated toward horizontal. The armrests 18, 20 are lowered vertically closer to horizontal alignment with the top of the seat bottom 14. The lower seatback 22, upper seatback 24, and headrest 26, which are independently movable, are adjusted to give the seatback 12 a shallow, gradual curve. The partially reclined sitting position may be comfortable for sleeping, watching television or lounging, for example.

Referring to FIGS. 5 and 6, respective perspective and side views show the seat 10 achieving an in-bed lounge sitting position in which the seat bottom 14, legrest 16, and armrests 18, 20 are horizontally aligned to cooperatively form a portion of a bed, and the seatback 12 is curved upward to support the upper body and head in a lounge position. In the in-bed lounge sitting position, the lower seatback 22, upper seatback 24, and headrest 26 are adjusted to provide a more pronounced or steeper curve than the seatback 12 in the partially reclined sitting position shown in FIGS. 3 and 4. The segmentation of the seatback 12 into the lower seatback 22, upper seatback 24, and headrest 26 is most apparent in 5 and 6 as evidenced by the spacing between the respective segments. The in-bed lounge sitting position may be comfortable for sleeping, watching television, lounging, reading, elevating the feet, etc.

Referring to FIGS. 7 and 8, respective perspective and side views show the seat 10 in a flat, horizontal bed in which the seatback 12, seat bottom 14, legrest 16, and armrests 18, 20 are substantially coplanar and horizontal. The lower seatback 22, upper seatback 24, and headrest 26 are adjusted such that the seatback is substantially flat and horizontal. The armrests 18, 20 are at their lowest vertical position relative to the floor when the seat 10 is in the bed position.

Referring to FIGS. 9-14, the seat base generally includes spaced left and right spreaders 30, 32, forward and rear transverse beam tubes 34, 36, and spaced left and right legs 38, 40. The legs 38, 40 may be attached to seat tracks 42 in the floor 28 using conventional anti-rattle track fasteners. The seat base frame supports the weight of the seat, houses actuators and associated cabling, and may help to guide the movement of the seat 10 throughout its range of motion.

The lower seatback 22, upper seatback 24, and headrest 26 are able to move independently as the seatback 12 reclines. The bottom end of the lower seatback 22 is pivotably attached to the rear end of the seat bottom 14 such that the lower seatback portion pivots about pivot axis 44. A first electromechanical actuator 46 (e.g., linear actuator) arranged vertically along the backside of the lower seatback 22 and attached to the seat bottom 14 operates to drive the pivoting movement of the lower seatback 22 relative to the seat bottom 14.

The bottom end of the upper seatback 24 is pivotably attached to the top end of the lower seatback 22 such that the upper seatback pivots relative to the lower seatback about pivot axis 48 to adjust the angle therebetween. A second electromechanical actuator 50 arranged horizontally on the backside of the upper seatback 24 operates to drive the movement of the upper seatback 24 relative to the lower seatback 22 to adjust the angle therebtween. Specifically, gears 52 coupled to the ends of a rotating shaft 54 of the second actuator 50 are meshed with an arcuate toothed member 56 of the lower seatback 22 such that rotation of the shaft 54 moves the gears 52 along the length of the arcuate toothed member 56 to move the upper seatback portion 24 to change the angle of the upper seatback 24 relative to the lower seatback 22. The length, curvature, and orientation of the arcuate toothed member 56, as well as the gear diameter and number of gear teeth, can be customized to adjust the angle, speed and range of movement of the upper seatback 24 relative to the lower seatback 22. The angle between the upper seatback 24 and lower seatback 22 may be greatest when the seat 10 is shown in the in-bed lounge sitting position of FIGS. 5 and 6.

The headrest 26 is supported by the upper seatback 24 and is adjustable in height relative thereto. A slide mechanism of the headrest 26 engages on the backside of the upper seatback 24, and a third actuator 58 arranged vertically along the backside of the upper seatback 24 and attached to the bottom end of the headrest 26 operates to adjust the position of the headrest 26 relative to the upper seatback 24. For example, the third actuator 58 may lengthen to drive the headrest 26 apart from the upper seatback 24, and retract to bring the headrest 26 closer to the upper seatback 24. Movement of the headrest 26 relative to the upper seatback 24 may be linear or along a curve, and may be customized based on the shape and configuration of the sliding mechanism interconnecting the two. As shown, the headrest 26 and upper seatback 24 are attached at an angle and the sliding mechanism provides linear movement of the headrest 26.

In a further embodiment, the headrest 26 may be segmented into a center portion 60 and side portions 62 that move independently as the seat 10 reclines. Movement between the center portion 60 and side portions 62 may be achieved by pivotably connecting each side portion 62 to its respective side of the center portion 60, arranging an actuator horizontally along the backside of the center portion 60, and attaching the ends of a shaft of the actuator to the side portions 62 such that as the actuator lengthens the side portions are driven forward and/or outward relative to the center portion, and as the actuator shortens the side portions are driven rearward and/or toward the center portion. The side portions 62 may move together or independently relative to the center portion 60. Providing adjustability in the headrest 26 provides lateral support to the head when the seat 10 in is the upright sitting position and allows the headrest to fold flat in the bed position, for example.

Figure 15:
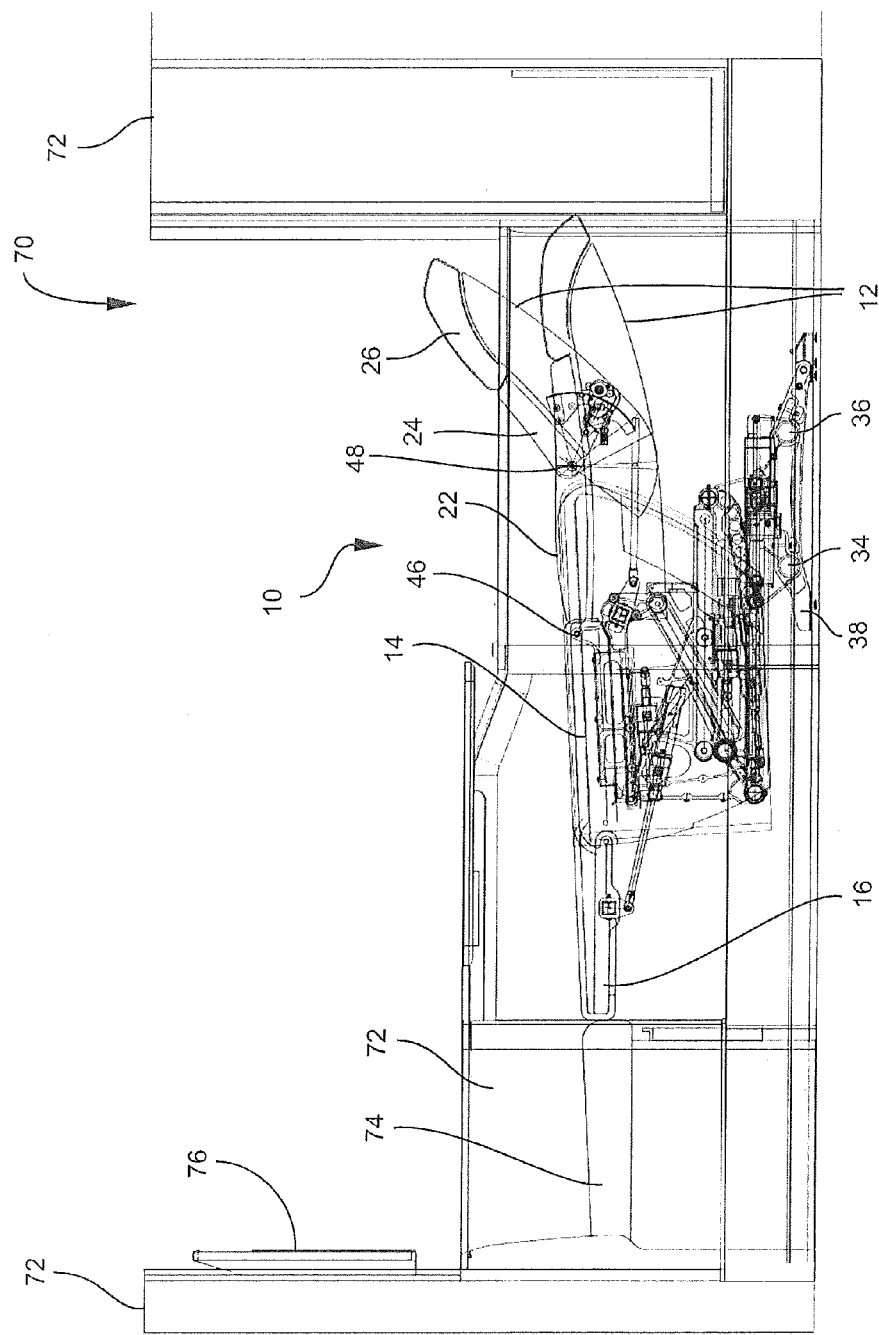
FIG. 15 is a side view showing the seat of FIG. 1 positioned within a suite in a premium seating class in an aircraft.

Referring to FIG. 15, the seat 10 is shown installed within a suite 70. The primary seat frame members and seat actuators are shown for driving movement of the seatback 12, seat bottom 14, and legrest 16 to achieve the various sitting/sleeping positions described above. The actuators are preferably arranged beneath the seat bottom and along the backside of the seatback along with the associated cabling. Independent linear actuators may be provided for driving independent movement of the seat bottom 14 and legrest 16, in addition to the actuators discussed above in connection with the segmented seatback and headrest. Thus, the legrest 16 may be adjusted independent of seatback recline using a fourth actuator dedicated for legrest movement. In an alternative embodiment, the movement of the seatback 12, seat bottom 14, and legrest 16 may be coupled.

The actuator positioned beneath the seat bottom 14 may be operable for adjusting the seat bottom 14 relative to the seat frame base. Movement of the various seating surfaces may be controlled through a control panel located on the seat itself, such as on one of the armrests, or adjacent the seat within reach. Seat controls may be capable of being overridden by flight crew controls to return the seat 10 to the mandatory sitting position for TTOL.

Suite 70 is defined by a plurality of privacy walls 72 that may be part of only one suite or shared walls between laterally and/or longitudinally adjacent suites. One of the walls may include an opening for aisle access. The suite 70 includes the seat 10 as described above, and additionally includes an ottoman 74 positioned directly forward of the seat 10. The ottoman 74 is spaced apart from the seat 10 such that space is provided between the front of the seat and the ottoman when the seat in upright, and cooperates with the legrest 16 when the legrest is fully deployed to extend the length of the bed. Thus, in the bed or in-bed lounge sitting positions the top surface of the ottoman 74 lies in the same plane as the fully deployed legrest 16 and seat bottom 14. The suite 70 may further include a video monitor 76 positioned vertically above the ottoman 74 and directly forward of the seat 10 in order to be positioned at a comfortable viewing angle when the seat is in the upright, reclined or in-bed lounge sitting positions.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. An adjustable aircraft passenger seat, comprising:
a seat bottom;
a legrest adjustable in angle relative to the seat bottom;
a seatback adjustable in angle relative to the seat bottom, the seatback segmented into a lower seatback and an upper seatback, the lower seatback adjustable in angle relative to the seat bottom and the upper seatback adjustable in angle relative to the lower seatback;
a headrest separate from the seatback; and
a first actuator dedicated for lower seatback movement and a second actuator dedicated for upper seatback movement;
wherein the upper seatback is pivotably attached at one end to the lower seatback, and the second actuator is horizontally-oriented on a backside of the upper seatback to drive a rotating gear meshed with an arcuate toothed guide of the lower seatback to move the gear along a length of the arcuate toothed guide to adjust an angle of the upper seatback relative to the lower seatback; and
wherein the adjustable passenger seat is adjustable to achieve an upright sitting position for taxi, take-off and landing, and an in-bed lounge sitting position in which the legrest and seat bottom are coplanar, the lower seatback is at an angle to the seat bottom, and the upper seatback is at an angle to the lower seatback.

2. The passenger seat of claim 1, wherein the lower seatback is pivotably attached at one end to the seat bottom, and the first actuator is vertically-oriented on a backside of the lower seatback to drive pivoting movement of the lower seatback relative to the seat bottom.

3. The passenger seat of claim 1, wherein the headrest comprises a center portion and side portions adjustable relative to the center portion.

4. The passenger seat of claim 1, further comprising left and right armrests positioned on opposite sides of the seat bottom.

5. The passenger seat of claim 1, further comprising a third a actuator dedicated for headrest movement of the headrest.

6. The passenger seat of claim 5, wherein the third actuator is vertically-oriented on a backside of the upper seatback and connected to the headrest to drive the headrest toward and apart from the upper seatback.

7. The passenger seat of claim 5, wherein the headrest is arranged to slide along vertically-oriented rails on a backside of the upper seatback to slide the headrest toward and apart from the upper seatback.

8. An aircraft passenger suite, comprising:
a plurality of privacy walls defining boundaries of the passenger suite; and
a passenger seat positioned within the passenger suite, the passenger seat comprising:
a seat bottom,
a legrest adjustable in angle relative to the seat bottom,
a seatback adjustable in angle relative to the seat bottom, the seatback segmented into a lower seatback and an upper seatback, the lower seatback adjustable in angle relative to the seat bottom and the upper seatback adjustable in angle relative to the lower seatback,
a headrest separate from the seatback, and
a first actuator dedicated for lower seatback movement, a second actuator dedicated for upper seatback movement, and a third actuator dedicated for legrest movement,
wherein the upper seatback is pivotably attached at one end to the lower seatback, and the second actuator is horizontally-oriented on a backside of the upper seatback to drive a rotating gear meshed with an arcuate toothed guide of the lower seatback to move the gear along a length of the arcuate toothed guide to adjust an angle of the upper seatback relative to the lower seatback; and
wherein the passenger seat is adjustable to achieve an upright sitting position for taxi, take-off and landing, and an in-bed lounge sitting position in which the legrest and seat bottom are coplanar, the lower seatback is at an angle to the seat bottom, and the upper seatback is at an angle to the lower seatback.

9. The passenger suite of claim 8, further comprising an ottoman positioned directly forward of the passenger seat, wherein the ottoman is spaced apart from the passenger seat such that a front of the ottoman aligns with an end of the legrest when the legrest is fully deployed.

10. The passenger suite of claim 9, further comprising a video monitor positioned vertically above the ottoman and directly forward of the passenger seat.

11. The passenger suite of claim 8, wherein the lower seatback is pivotably attached at one end to the seat bottom, and the first actuator is vertically-oriented on a backside of the lower seatback to drive pivoting movement of the lower seatback relative to the seat bottom.

12. The passenger suite of claim 8, wherein the headrest comprises a center portion and side portions adjustable relative to the center portion.

13. The passenger suite of claim 8, wherein the passenger seat further comprises left and right armrests positioned on opposite sides of the seat bottom.

14. The passenger seat of claim 8, further comprising a fourth actuator dedicated for headrest movement of the headrest.

15. The passenger suite of claim 14, wherein the fourth actuator is vertically-oriented on a backside of the upper seatback and connected to the headrest to drive the headrest toward and apart from the upper seatback.

16. The passenger suite of claim 14, wherein the headrest is arranged to slide along vertically-oriented rails on a backside of the upper seatback to slide the headrest toward and apart from the upper seatback.

* * * * *